(12) United States Patent
Someya

(10) Patent No.: US 6,222,893 B1
(45) Date of Patent: Apr. 24, 2001

(54) SYNCHRONIZING CIRCUIT

(75) Inventor: Masafumi Someya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/354,180

(22) Filed: Jul. 16, 1999

(30) Foreign Application Priority Data

Jul. 17, 1998 (JP) .................................................. 10-203644

(51) Int. Cl.⁷ ....................................................... H04L 7/00
(52) U.S. Cl. ............................................ 375/355; 375/357
(58) Field of Search .................................. 375/354, 355, 375/357, 242

(56) References Cited

U.S. PATENT DOCUMENTS 5,016,258 * 5/1991 Tanaka et al. ........................ 375/242
5,905,766 * 5/1999 Nguyen ................................ 375/354

FOREIGN PATENT DOCUMENTS 10-13398   1/1998 (JP) .
10-164037  6/1998 (JP) .

* cited by examiner

*Primary Examiner*—Chi Pham
*Assistant Examiner*—Phuong Phu
(74) *Attorney, Agent, or Firm*—Hutchins, Wheeler & Dittmar

(57) ABSTRACT

It is an object of the invention to provide a synchronizing circuit which prevents an occurrence of an unexpected output data caused by latching an input signal on a course of a transition thereof. An input signal Si is represented as a binary data having a width of three bits which increases by "1" every clock, and encoded into a signal having a width of eight bits. The encoded signal having the width of eight bits is latched and restarted synchronizing with a clock (CLK1) by a F/F circuit and another F/F circuit operating in accordance with an asynchronous clock (CLK2). The output signal of the F/F circuit is decoded into a signal having a width of three bits by the decoder, and outputted as an output signal So. Since an encoder is provided, the data before or after a transition can be correctly outputted, even when the data is latched by the F/F circuit on a course of the transition.

7 Claims, 7 Drawing Sheets

SYNCHRONIZING CIRCUIT

FIELD OF THE INVENTION

The invention relates to a synchronizing circuit, and especially to a synchronizing circuit for synchronizing an input signal with an asynchronous clock.

BACKGROUND OF THE INVENTION

In an interface of a computer, the maximum clock frequency is determined on the basis of a standard required to the outside, and it sometimes occurs that a communication or a process cannot be performed without comforting to the aforementioned standard. However, in the inside of the apparatus, it is possible to increase the clock frequency so long as circuit elements, such as ICs, can follow, and a speed of a data process can be increased in proportion to the clock frequency. In such a case, it is indispensable to synchronize a data and a control signal changing in accordance with a clock of the interface with a system clock, and the synchronizing circuit is used for this purpose.

A control signal changing by "1" every clock, such as a pointer of a FIFO (First In First Out) type or a counter, is sometimes desired to be synchronized. For example, as a method for synchronizing datas composed of plural bits, a circuit of asynchronous FIFO type, in which there is a difference ina clock between the write and read circuits, is used. In such a case, it is necessary to certainly synchronize the pointers of the write and read circuits.

The simplest structure of the synchronizing circuit is that a data to be synchronized is inputted to a flip-flop circuit (a F/F circuit, hereinafter), the F/F circuit is made to operate by applying a clock signal thereto, and a synchronized data is outputted.

According to the conventional synchronizing circuit, a following problem occurs.

In case that a pointer represented by a ordinary binary code is synchronized, if the data is latched by the synchronizing circuit (the F/F circuit) on a course of a transition of the data, it may well be that the data will be regarded as a quite different one, because there is a difference in delay between the respective bits. For example, in case that a signal composed of three bits is latched on a course of a transition from "011" to "100", if bit 2 of "100" is latched after the transition and bits 1 and 0 are latched before the transition, the output data of the synchronizing circuit becomes "111", which is quite different from "011" and "100". Moreover, since "111" may occur at the time of normal operation, the error of synchronizing cannot be detected.

Next, in case that a pointer of a one hot type is latched on the course of the transition, the number of "1"s is sometimes regarded as 0 or 2. For example, in case that a pointer composed of five bits is latched on a course of a transition form "00010" to "00100", if bit 1 or 2 delays, it may well be that the output data of the synchronizing circuit will be regarded as "00110" or "00000". However, in such a case, it can be clearly recognized that an error occurs in the synchronizing circuit. In order to cope with such a situation, the synchronizing circuit must be provided with a device for processing an irregularly synchronized data, hence much labor is required for a circuit design, a structure becomes complicated, and an increasing in cost is inevitable.

SUMMARY OF THE INVENTION

Accordingly, it is an object of the invention to provide a synchronizing circuit which prevents an occurrence of an unexpected output data caused by latching a data to be synchronized on a course of a transition thereof.

According to the feature of the invention, a synchronizing circuit comprises:

A synchronizing circuit, which synchronizes a binary data composed of n bits and changing synchronizing with a first clock of a first frequency with a second clock of a second frequency, comprising:

a signal-generating circuit for generating a binary data composed N (N≧-n) bits by encoding the binary data composed of n bits, a latch circuit for latching the binary data composed of N bits synchronizing with the second clock, and a decoding circuit for decoding the binary data composed of N bits latched by the latch circuit into a binary code composed of n bits.

BRIEF DESCRIPTION OF THE DRAWING

The invention will be explained in more detail in conjunction with appended drawings, wherein.

DESCRIPTION OF THE PREFERRED EMBODIMENTS

Figure 1:
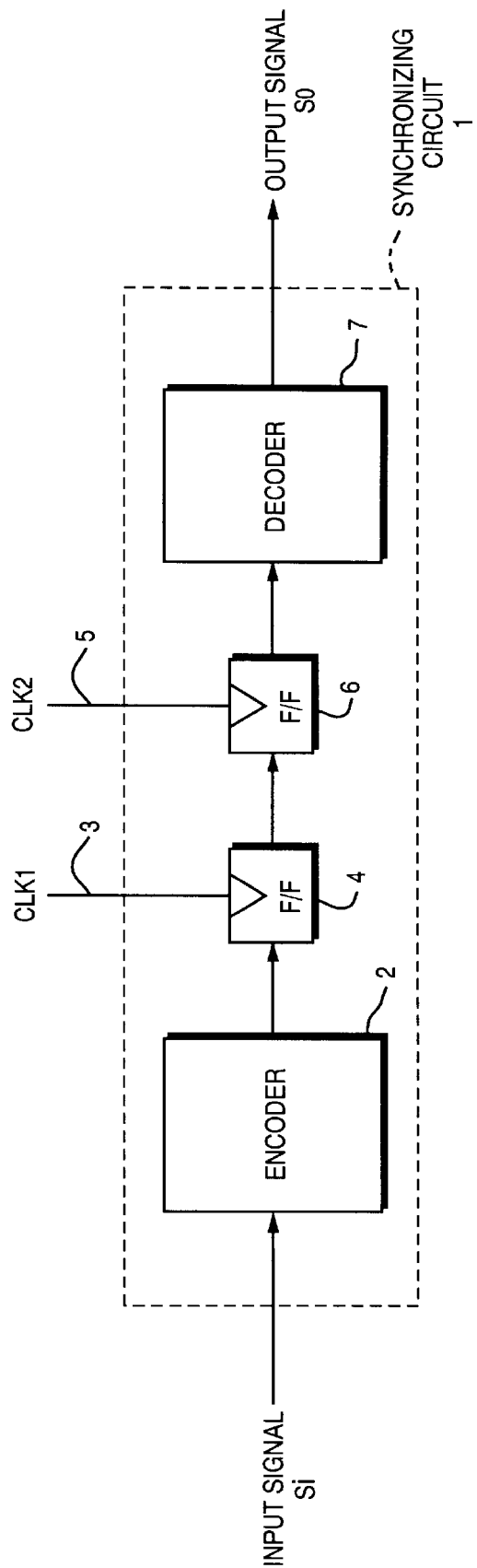
FIG. 1 s a block diagram for showing a synchronizing circuit according to the first preferred embodiment of the invention.

Thereafter, embodiments of the invention will be explained referring to appended drawings, FIG. 1 shows a synchronizing circuit according to the first preferred embodiment of the invention. The synchronizing circuit is composed of an encoder 2 for encoding an input signal Si, a F/F circuit 4 serving as a latch circuit which synchronizes an output signal of the encoder 2 with a clock 3 (CLK1), a F/F circuit 6 serving as a latch circuit which synchronizes an output signal of the F/F circuit 4 with a clock 5 (CLK2), and a decoder 7 which decodes an output signal of the F/F circuit 6 and outputs an output signal So. The clock 3 (CLK1) is not synchronized with the clock 5 (CLK2). The input signal Si is composed of plural bits which have transmitted through plural signal lines and changes its contents every clock synchronizing with the clock 3 (CLK1) as a pointer or a counter. First, the input signal Si is encoded by the encoder 2. A signal encoded by the encoder 2 is latched and restarted by the F/F circuit 4 synchronizing with the clock 3 (CLK1). The encoder 2 and the F/F circuit 4 constitutes a signal-generating circuit, which converts the input signal Si having a width of n bits into an output signal having a width of N bits, where n and N are integers satisfying n and N≧2 and N≧n. Since the output signal of the F/F circuit 4 is further latched by the F/F circuit 6 which operates synchronizing with the clock 5 (CLK2), the aforementioned output signal is correctly encoded by the decoder 7. The decoder 7 converts the signal having the width of N bits into that having the width of n bits, and generates an output signal So. As mentioned in the above, since the synchronizing circuit 1 latches the transition state of the input signal, a situation that the input signal is regarded as an unexpectedly changing signal can be prevented. The operation of the synchronizing circuit 1 will be concretely explained referring to FIG. 2.

Figure 2:
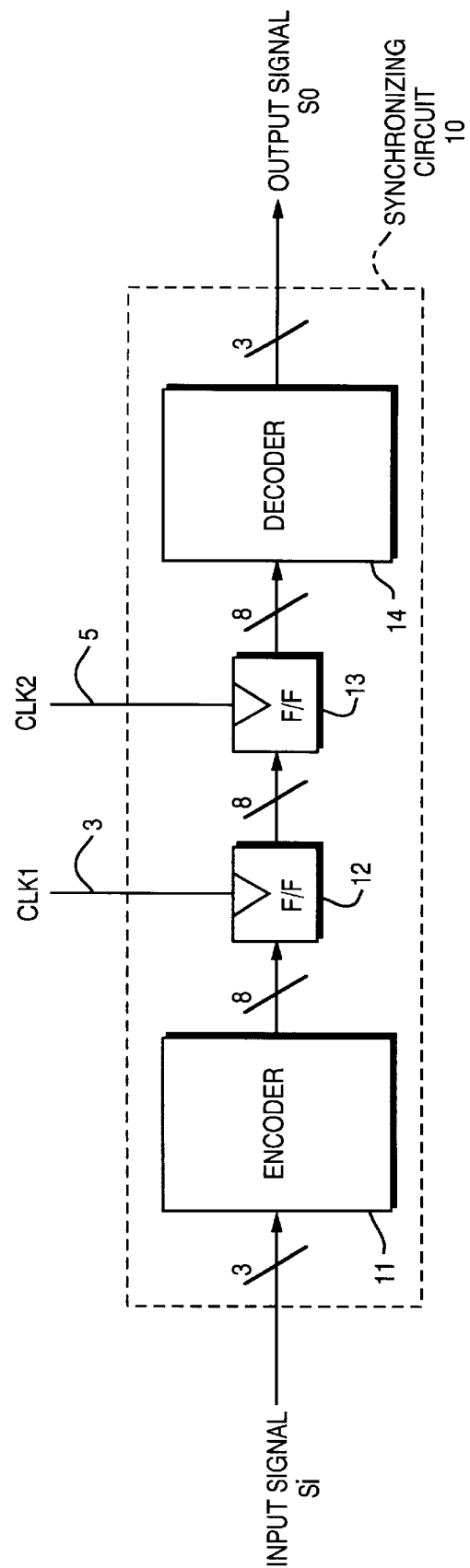
FIG. 2 is a block diagram for showing a concrete structure of a synchronizing circuit shown in FIG. 1.

FIG. 2 is a circuit diagram for concretely showing the numbers of bits of the signals at the stages of encoding, latching and decoding. In this drawing, the signals corresponding to those shown in FIG. 1 are represented by the same notations as those shown in FIG. 1. Thereafter, an explanation will be given for case that the input signal Si is a pointer having the width of three bits (n=3) and takes the values of 0 to 7; and the output signal of the encoder 11 has a width of eight bits (N=8).

The synchronizing circuit 10 according to the embodiment of the invention is composed of the encoder 11 which converts the input signal S3i having the width of three bits into the output signal having the width of eight bits, the F/F circuit 12 which synchronizes the output signal of the encoder 11 having the width of eight bits with the clock 3 (CLK1), the F/F circuit 13 which synchronizes the output signal of the F/F circuit 12 having the width of eight bits with the clock signal 5 (CLK2), and the decoder 14 which decodes the output signal S13 of the F/F circuit 13 having the width of eight bits and obtains the output signal So having the width of three bits. The content of the output signal So is the same as that of input signal S3i. As mentioned in the above, although the reference numerals of the structural elements shown in FIG. 1 are different from those shown in FIG. 2, there is no substantial difference in the function between the circuit structures shown in these drawings. Moreover, the encoder 11 and the F/F circuit 12 constitutes a signal generating circuit similarly to the case of FIG. 1.

Table 1 shows the construction of the input and output datas of the encoder 11 shown in FIG. 2, and the input signal S3i having the width of three bits is encoded into the output signal having the width of eight bits. In table 1, a representation of a expanded one hot type is adopted, and the number of "1"s is not one but two.

TABLE 1

| input of encoder 11 | output of encoder 11 |
|---|---|
| 0 0 0 | 0 0 0 0 0 0 1 1 |
| 0 0 1 | 0 0 0 0 0 1 1 0 |
| 0 1 0 | 0 0 0 0 1 1 0 0 |
| 0 1 1 | 0 0 0 1 1 0 0 0 |
| 1 0 0 | 0 0 1 1 0 0 0 0 |
| 1 0 1 | 0 1 1 0 0 0 0 0 |
| 1 1 0 | 1 1 0 0 0 0 0 0 |
| 1 1 1 | 1 0 0 0 0 0 0 1 |

Figure 3:
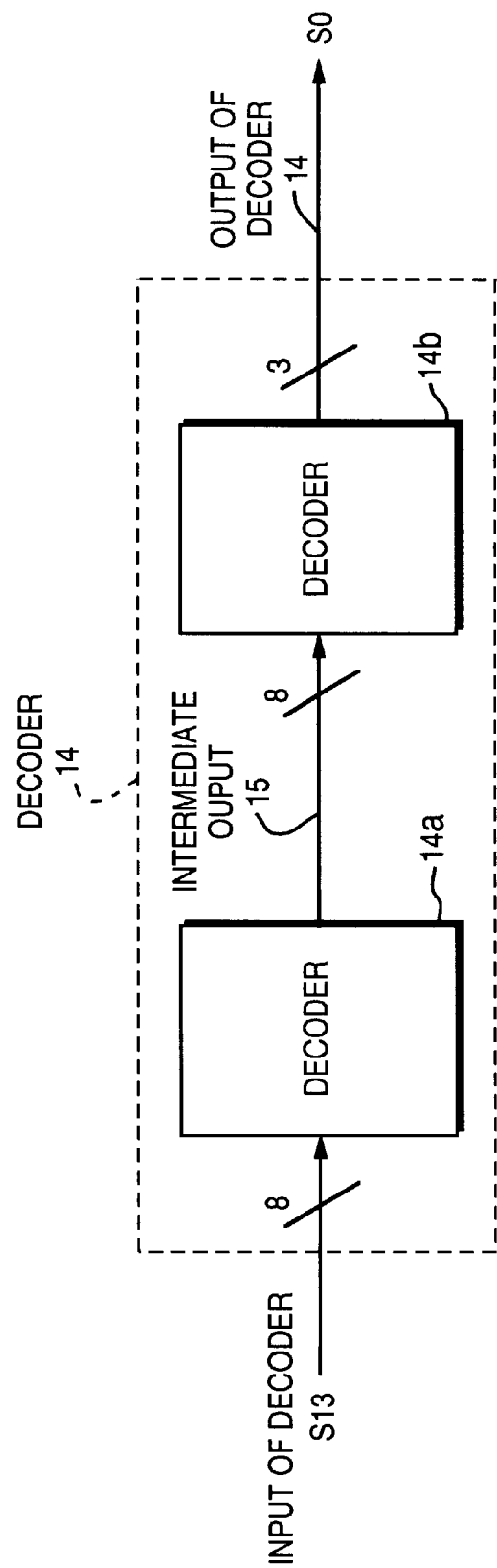
FIG. 3 is a block diagram for showing a detailed structure of a decoder.

FIG. 3 shows the structure of the decoder 14 in detail. The decoder 14 is composed of a decoder 14a which decodes the output signal of the F/F circuit 13 and a decoder 14b which decodes the output signal of the decoder 14a (an intermediate output signal 15, hereinafter) and outputs the output signal So.

Table 2 shows the construction of the input and output datas of the decoder 14b.

TABLE 2

| intermediate output 15 | output of decoer 14 |
|---|---|
| 0 0 0 0 0 0 0 1 | 0 0 0 |
| 0 0 0 0 0 0 1 0 | 0 0 1 |
| 0 0 0 0 0 1 0 0 | 0 1 0 |
| 0 0 0 0 1 0 0 0 | 0 1 1 |
| 0 0 0 1 0 0 0 0 | 1 0 0 |
| 0 0 1 0 0 0 0 0 | 1 0 1 |
| 0 1 0 0 0 0 0 0 | 1 1 0 |
| 1 0 0 0 0 0 0 0 | 1 1 1 |

In the circuit shown in FIG. 3, a data having a width of eight bits (an input signal S13-0 to S13-7 shown in FIG. 4), which is supplied from the encoder 11 to the decoder 14a, via the F/F circuits FF12 and FF13, has a form shown in a right column of Table 1. The output data of the decoder 14a has a form shown in a left column of Table 2, and converted by the decoder 14b into a data shown in a right column of the Table 2. The intermediate output signal 15 supplied from the decoder 14a is expressed as a data of a one hot type comprising a "1", and decoded into a signal having a width of three bits as shown in Table 2.

Figure 4:
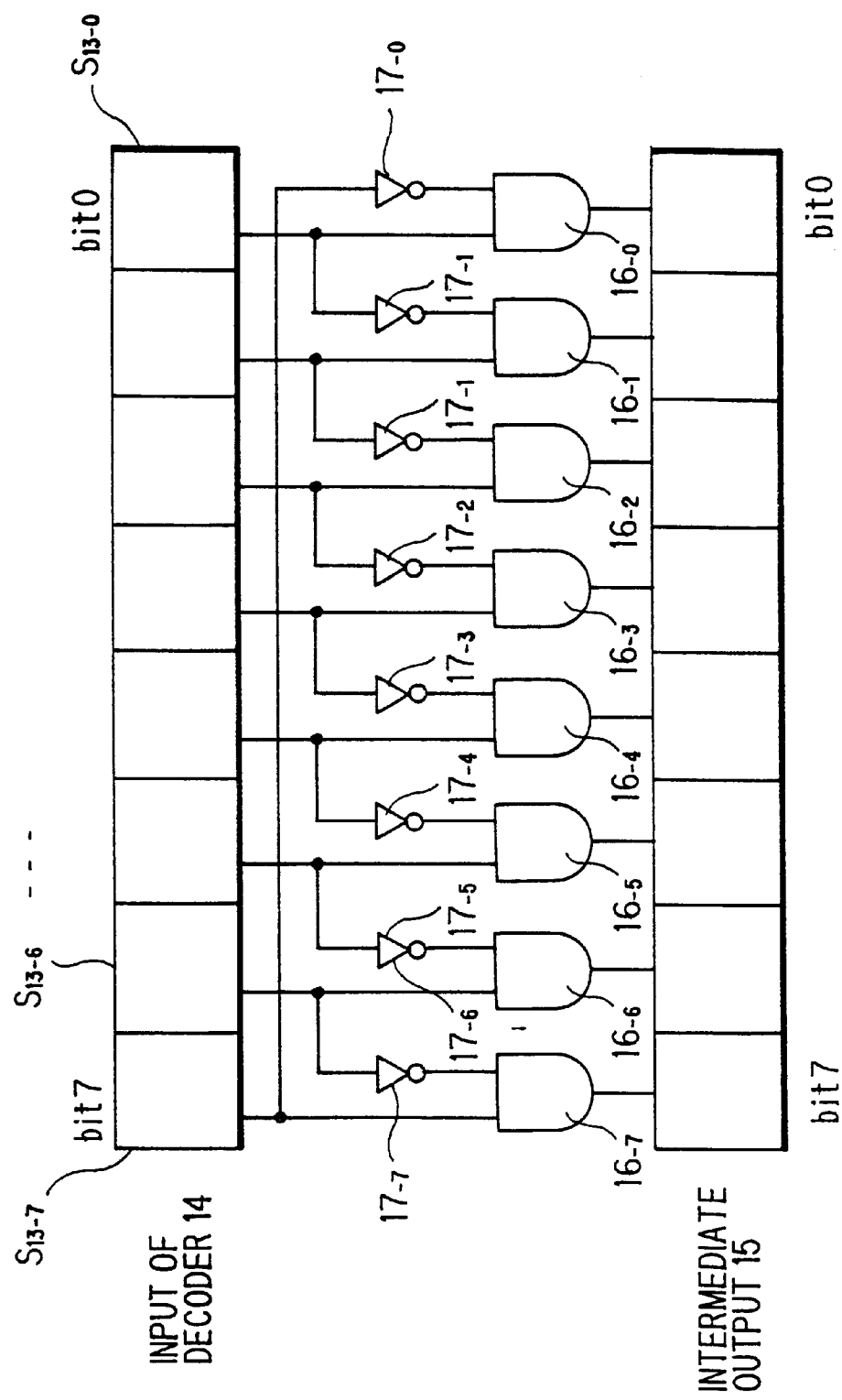
FIG. 4 is a circuit diagram for showing a structure of a decoder formed of a logical circuit which is allocated at an input end of a diagram shown in FIG. 3.

FIG. 4 shows a structure of a logical circuit used in a decoder 14a. As shown in FIG. 4, bits 0 to 7, those respectively corresponding to bits of the input signal of the F/F circuit 13 S13-0 to s13-7, are respectively supplied to left input terminals of AND gates 16-0 to 16-7, and input terminals of the inverters 17-1 to 17-7 and 17-0. Output datas of the AND gates 16-0 to 16-7 respectively correspond to bits 0 to 7 of the intermediate output signal 15. As seen from FIG. 4, the AND gate 16-i (i=1, 2, 3, . . . , 7) outputs 1 only in case that S13-i=1 and S13-i+1=0. The AND gate 17-0 outputs 1 only in case that S13-0=1 and S13-7=0. The output of the and gate 16-i corresponds to bit i of the intermediate output signal 15.

Next, the operation of the synchronizing circuit 10 shown in FIG. 2 will be explained. The input signal S3i is converted into a signal having a width of eight bits and two "1"s by the encoder 11. Spikes generated in the encoder 11 are removed by the F/F circuit 12. The output signal of the F/F circuit 12 is latched by the F/F circuit 13, which operates synchronizing with the clock 5 (an a synchronous clock) of the receiving side, and synchronized with the clock 5 (CLK2).

Thereafter, the operation of the synchronizing circuit 10 will be explained referring to FIG. 5 for a case that rise edges of the clock 3 (CLK1) and the clock 5 (CLK2) overlap each other and the F/F circuit 13 latches a course of a transition of the output signal of the F/F circuit 12 will be explained.

Figure 5:
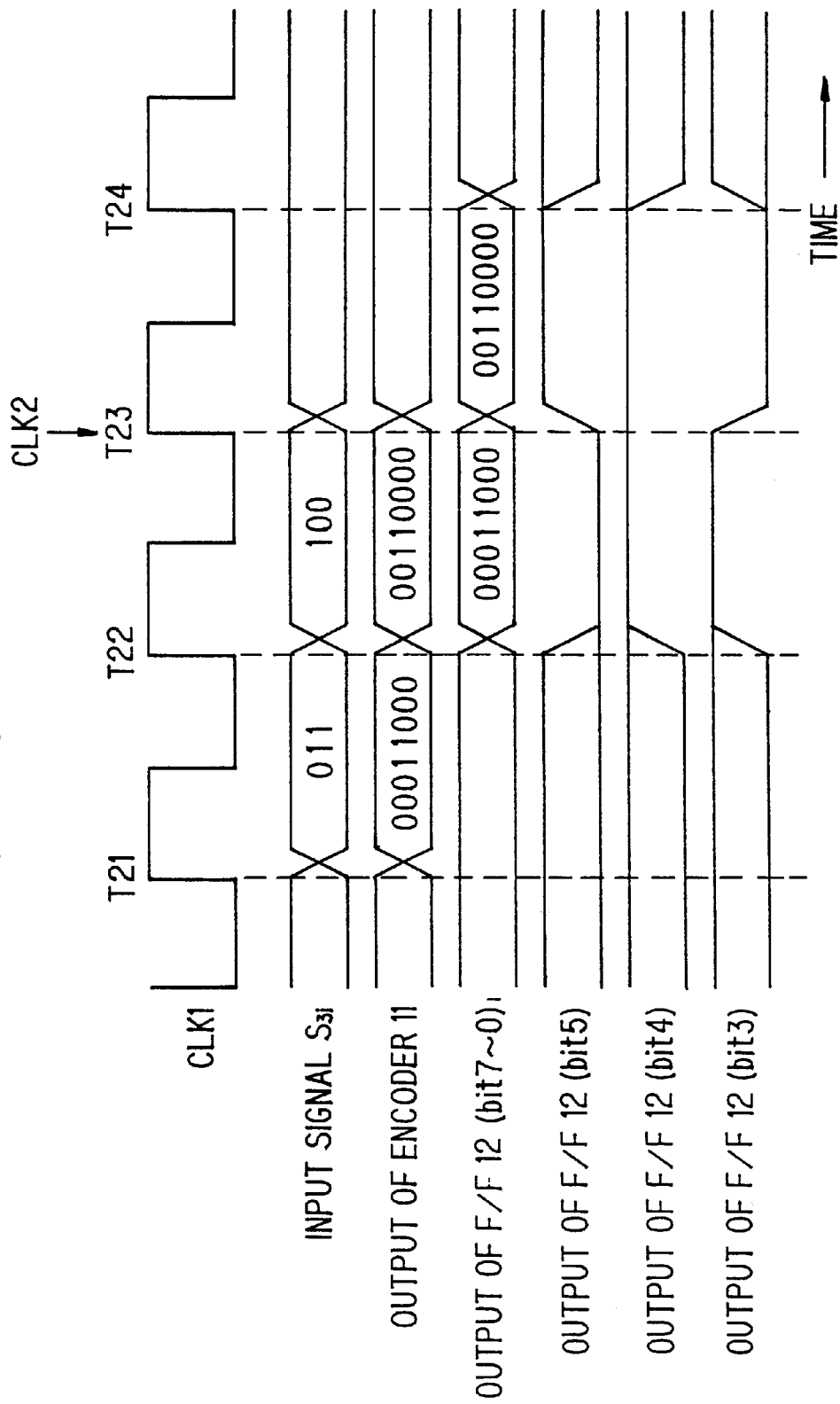
FIG. 5 is a timing chart for explaining an operation of a flip/flop circuit shown in FIG. 2.

FIG. 5 shows the operation of the F/F circuit 12. At present, it is assumed that the input signal S3i undergoes a transition from "011" to "100" at a time T22. In accordance with the aforementioned transition, the output of the F/F circuit 12 undergoes a transition at a time T23. If the rise edge of the clock 5 (CLK2) is near the time T23, bits of the output signal of the F/F circuit 12 is latched by the F/F circuit 13 before or after the transition dependently on a delay of the output of the F/F circuit 12 or the fluctuation of a delay time of a wiring pattern. However, since bits of the output signal of the F/F circuit 12 takes the same values before and after the transition except bits 3 and 5 (that is to say, the upper "00" and the lower "000" are unchanged by the transition), the data latched by the F/F circuit 13 is almost unchanged, even when the output of the F/F circuit 12 is on the course of the transition. That is to say, in case that the F/F circuit 13 latches the output data of the F/F circuit 12 near the time T23, bits 0 to 2 are "0", bit 4 is "1", and bit 6 to 7 are "0"; and only bits 3 and 5 are latched at "0" or "1" dependently on the delay of the data. Accordingly, the signal latched by the F/F circuit 13 can be represented by "100X1X000". X is "0" or "1".

Figure 6:
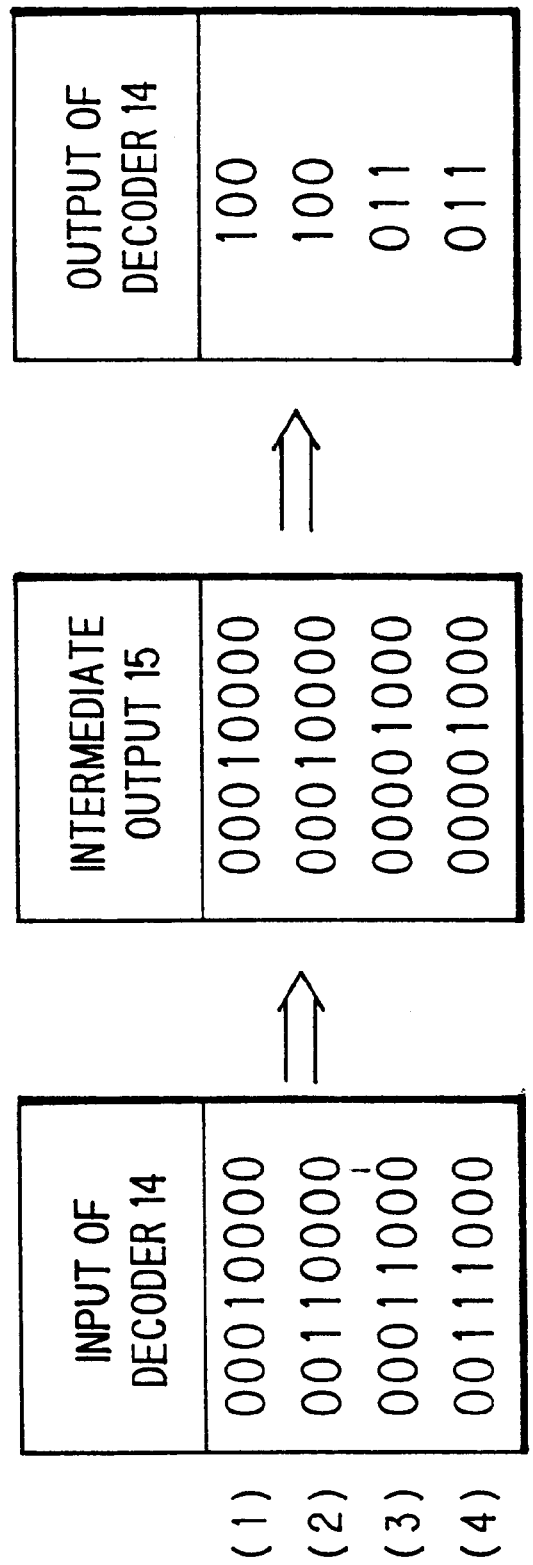
FIG. 6 shows a result of decoding performed by a decoder.

FIG. 6 shows a relation between the input and output datas in the decoder 14 shown in FIG. 3. Concerning the input data of the decoder 14, four cases corresponding to (1) to (4) in FIG. 6 can be considered.

The input signal composed of eight bits shown in a left column of FIG. 6 is converted into the intermediate output signal shown in a center column, which is further decoded by the decoder 14b into "011" or "100" as shown in a right column of FIG. 6 and outputted as the output signal So.

In the above explanation on the operation of the synchronizing circuit according to the invention, since a moment that the output data of the encoder 11 undergoes a transition from "00011000" representing "011" to "00110000" representing "100" is discussed, the result of the encoding being "011" corresponding to "before transition" or "100" corresponding to "after transition" means synchronizing being correctly performed.

Next, another embodiment of the invention will be explained.

Figure 7:
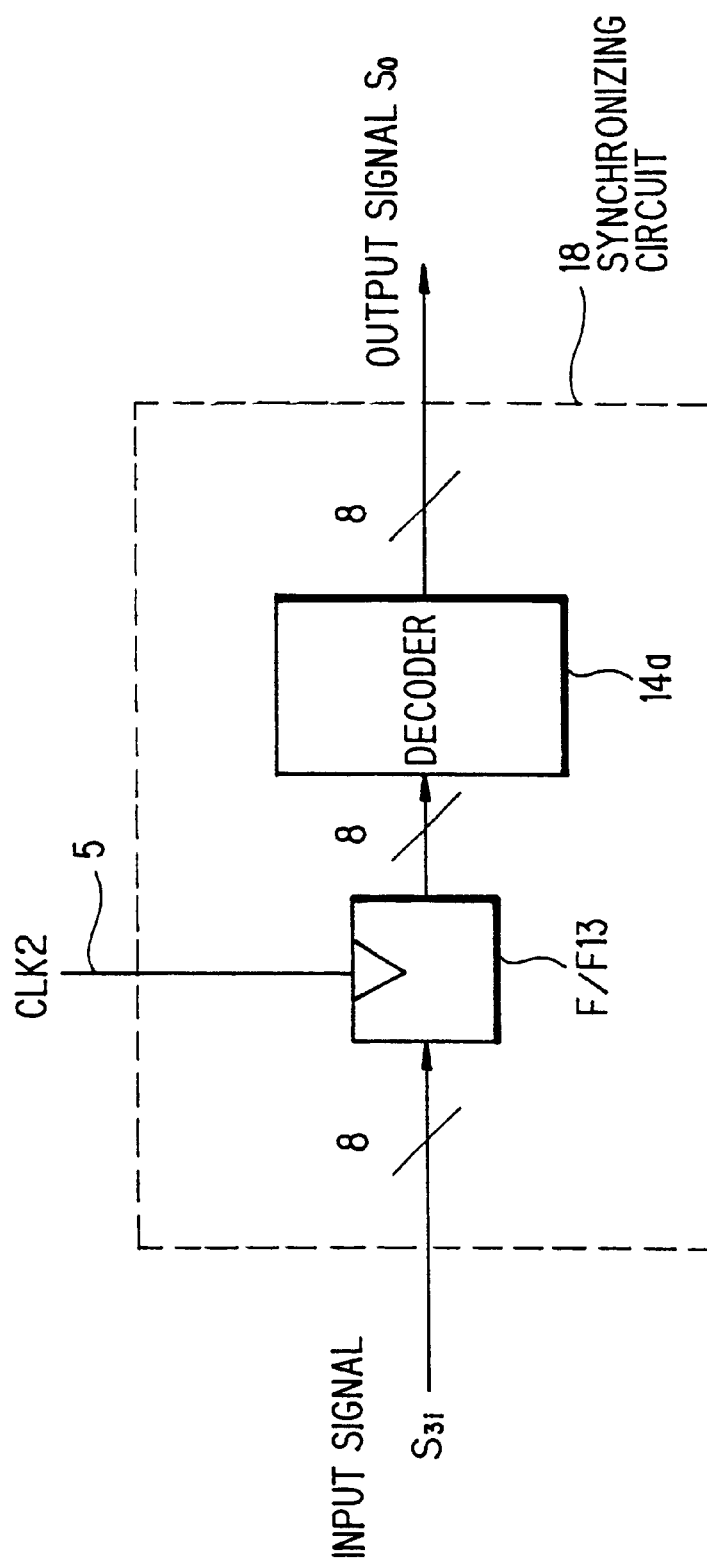
FIG. 7 is a block diagram for showing a structure of a synchronizing circuit according to the second preferred embodiment of the invention.

FIG. 7 shows a synchronizing circuit according to the second preferred embodiment of the invention. The synchronizing circuit 18 shown in FIG. 7 is composed of a F/F circuit 13 which is shown in FIG. 2 and operates synchronizing with a clock 5 (CLK2) and a decoder 14a shown in FIG. 3. An input signal S3i of the F/F circuit 13 is composed of eight bits, a form of which is the same as that of the data shown in Table 1, that is to say, the output of the encoder 11 shown in FIG. 2. As mentioned in the above, since the synchronizing circuit 18 is supplied with an input signal which is the same as an encoded data, there is no necessity for providing the encoder. Moreover, since the encoder is not used, the F/F circuit 12 for removing spikes, which was necessary in the circuit shown in FIG. 2, becomes unnecessary. Moreover, since the data of a one hot type is used after synchronizing, decoding becomes unnecessary also. That is to say, there is no necessity for providing the decoder 14b shown in FIG. 3.

As mentioned in the above, in the synchronizing circuit 18 shown in FIG. 7, the encoder 11, the F/F circuit 12 and the decoder 14b becomes unnecessary. Accordingly, the synchronizing circuit can be small sized and simplified.

As seen from the above explanation, since an input binary data having a width of n bits is encoded into a binary data having a width of N bits, which is again decoded into the binary data having the width of n bits, the data before or after the transition can be obtained even in case that the data is latched on the course of the transition. Moreover, since the transition state of the input data is latched by the latch circuit, a situation that the input signal is regarded as an unexpectedly changing signal can be prevented. Accordingly, an irregular process becomes unnecessary, and a signal process after synchronizing becomes easy. Moreover since the circuit structure can be simplified, a circuit for processing an irregularly synchronized signal can be cut down, a cost is reduced, and reliability can be improved.

What is claimed is:

1. A synchronizing circuit which synchronizes a binary data composed of n bits with a first clock of a first frequency, and changing synchronizing with said first clock to a second clock of a second frequency, comprising:

a signal-generating circuit for generating a binary data composed of N bits, wherein N is greater than or equal to n, by encoding said binary data composed of n bits, a latch circuit for latching said binary data composed of N bits synchronizing with said second clock, and a decoding circuit for decoding said binary data composed of N bits latched by said latch circuit into a binary code composed of n bits, wherein:

said signal-generating circuit outputs a binary data composed of N bits containing a specified bit which holds a constant value independently of a transition of said first clock, and two bits which are respectively adjacent to said specified bit and change dependently on said transition of said first clock, and wherein N is equal to $2^n$ in said signal-generating circuit.

2. The synchronizing circuit as defined in claim 1, wherein:

said decoding circuit decodes said binary data composed of N bits in accordance with said position of said specified bit in said binary data composed of N bits.

3. The synchronizing circuit as defined in claim 1, wherein:

said decoding circuit decodes said binary data composed of N bits in accordance with a value of a bit which is adjacent to and lower than said specified bit.

4. The synchronizing circuit as defined in claim 1, wherein:

said decoding circuit decodes said binary data composed of N bits in accordance with values of said specified bit and said two bits adjacent to said specified bit.

5. The synchronizing circuit as defined in claim 1, wherein:

said signal-generating circuit comprises an encoder for generating said binary data composed of N bits and a latch circuit for latching said binary data composed of N bits which is outputted from said encoder synchronizing with said first clock.

6. The synchronizing circuit as defined in claim 5, wherein:

said encoder generates said binary data composed of N bits, in which "1"s are allocated to positions determined in accordance with said binary data composed of n bits, and "0"s are allocated to remaining positions.

7. The synchronizing circuit as defined in claim 1, wherein:

said decoding circuit comprises a first decoder for generating said binary data composed of N bits and a second decoder for generating said binary bits composed of n bits.

* * * * *